United States Patent
Coombs et al.

(10) Patent No.: US 7,938,418 B1
(45) Date of Patent: May 10, 2011

(54) UPPER MOUNT ASSEMBLY FOR AIR SPRING SUSPENSIONS

(75) Inventors: Joshua D. Coombs, East Lansing, MI (US); Kelly Parker, St. Johns, MI (US); Brian Wezensky, Portland, MI (US); Alfred N Seger, DeWitt, MI (US); Michael Larmann, Lansing, MI (US)

(73) Assignee: Air Lift Company, Lansing, MI (US)

( * ) Notice: Subject to any disclaimer, the term of this patent is extended or adjusted under 35 U.S.C. 154(b) by 31 days.

(21) Appl. No.: 12/261,028

(22) Filed: Oct. 29, 2008

Related U.S. Application Data

(60) Provisional application No. 60/983,488, filed on Oct. 29, 2007.

(51) Int. Cl.
*B60G 15/00* (2006.01)
(52) U.S. Cl. ......... 280/124.147; 280/124.155; 267/220
(58) Field of Classification Search ........... 280/124.147, 280/124.155, 124.158; 267/220, 64.11, 64.19, 267/64.27
See application file for complete search history.

(56) References Cited

U.S. PATENT DOCUMENTS

| | | | | |
|---|---|---|---|---|
| 5,009,401 | A * | 4/1991 | Weitzenhof | 267/64.21 |
| 5,133,573 | A * | 7/1992 | Kijima et al. | 280/124.155 |
| 5,180,144 | A * | 1/1993 | Hellyer et al. | 267/64.19 |
| 6,592,112 | B2 * | 7/2003 | Bishop et al. | 267/220 |
| 7,188,827 | B2 * | 3/2007 | Thomae et al. | 267/64.21 |
| 2003/0137086 | A1 * | 7/2003 | Gross et al. | 267/64.11 |
| 2006/0125164 | A1 * | 6/2006 | Mansueto et al. | 267/220 |

* cited by examiner

*Primary Examiner* — Paul N Dickson
*Assistant Examiner* — Joseph Rocca
(74) *Attorney, Agent, or Firm* — Delevie Law, PLC

(57) ABSTRACT

An upper mount assembly for an air-over vehicle suspension system includes an annular elastomeric isolator molded between two tubular bushing sleeves and press-fit into a through bore defined in an end cap. The inner bushing sleeve is adapted to receive the free end of the system's damper rod while an axial projection of the end cap is supported for relative rotation within a complementary through bore of a top plate. An axially-projecting lower surface on the elastomeric isolator defines a low-profile jounce bumper adapted to resiliently engage an upper end of the damper's cylinder body, thereby obviating the need for a separate jounce bumper while further accommodating relatively-low vehicle ride heights.

23 Claims, 3 Drawing Sheets

UPPER MOUNT ASSEMBLY FOR AIR SPRING SUSPENSIONS

CROSS-REFERENCE TO RELATED APPLICATIONS

This application claims benefit of provisional application No. 60/983,488 filed Oct. 29, 2007, the disclosure of which is hereby incorporated by reference.

FIELD OF THE INVENTION

The invention relates to vehicle suspension systems and, more particularly, to an upper mount assembly adapted for use in vehicle air spring suspension components, such as shocks and Macpherson struts featuring an air spring disposed "over" a shock absorber or damper.

BACKGROUND OF THE INVENTION

Vehicle suspensions generally incorporate shock absorbers or dampers to dampen or "smooth" the effects of road surface imperfections, such as bumps and potholes, on the vehicle's ride. For example, known "coil-over" shock absorber suspension systems typically deploy a coil spring about the cylinder body and telescoping damper rod of a fluid-type shock absorber, such that one end of the spring is seated about the cylinder body and the other end of the coil spring is seated on an upper mount assembly that is itself captured atop the spring, for example, by a fastener secured to the end of the damper rod. The upper mount assembly is, in turn, mounted to the vehicle's frame, which may include a suspension tower specially adapted to receive and support the upper mount assembly. A separate jounce bumper, typically formed of a relatively soft material such as microcellular urethane or the like, is disposed about the damper rod below the upper mount assembly to provide relatively-gradual energy dissipation if the suspension "bottoms out," i.e., if a wheel impact substantially or completely compresses the spring such that the upper end of the cylinder body engages the upper mount assembly.

Although coil-over-shock absorber suspension systems may be provided as part of a vehicle's original equipment, it is often desired to modify vehicles so as to provide for "air-over" vehicle suspension assemblies, in which the coil springs of such coil-over suspension systems is replaced by an air spring. Such air-over vehicle suspension systems advantageously permit the vehicle operator to readily adjust the relative inflation of the air spring to thereby adjust such suspension parameters as the vehicle's nominal ride height and the spring's nominal spring rate. Further, when used in combination with an on-board source of pressurized air, such air-over vehicle suspension systems advantageously permit the vehicle operator to vary such suspension parameters in real time. Unfortunately, when the vehicle is operated with a reduced ride height, known separate jounce bumpers may not be employed, because the reduced ride height may itself cause engagement of the cylinder body with the jounce bumper, with an attendant increase in vehicle noise, vibration, and harshness.

BRIEF SUMMARY OF THE INVENTION

It is an object of the invention to provide an upper mount for an air spring-and-damper vehicle suspension assembly featuring a low-profile jounce bumper, whereby the assembly may be advantageously operated at relatively lower ride heights.

It is also an object of the invention to provide an upper mount for an air spring-and-damper vehicle suspension assembly featuring a jounce bumper integrally formed with a damper rod isolator.

It is yet another object of the invention to provide an upper mount for an air spring-and-damper vehicle suspension assembly featuring axial and radial damping force isolation while further accommodating conical damper rod deflection to thereby minimize suspension noise and harshness.

In accordance with an aspect of the invention, an upper mount assembly is provided for a vehicle suspension assembly having a shock absorber or damper with a cylinder body and a damper rod telescopingly extending through one end of the cylinder body, and an air spring having a lower end supported on the cylinder body such that a free end of the damper rod extends in the direction of an upper end of the air spring. The upper mount assembly includes a top plate having an upper surface, a lower surface, and a through bore extending between the top plate's upper and lower surfaces; and an annular end cap adapted to sealingly support the upper end of the air spring, the end cap including an upper surface, a lower surface, and a through bore extending between the end cap's upper and lower surfaces.

The upper mount assembly also includes an annular elastomeric isolator retained within the through bore of the end cap. The elastomeric isolator includes a central bore, and an inner bushing sleeve is disposed within the central bore of the elastomeric isolator. The inner bushing sleeve includes an axially-disposed surface, and the inner bushing sleeve is adapted to receive the free end of the damper rod such that the radial shoulder on the damper rod abuttingly engages the axially-disposed surface of the inner bushing sleeve.

The upper mount assembly further includes a seal adapted to be disposed between the damper rod and the inner bushing sleeve when the damper rod is received within the inner bushing sleeve, whereby the seal achieves an air-tight seal between the damper rod and the inner bushing sleeve. In a preferred embodiment, the inner bushing sleeve includes an internal circumferential groove, and the seal is a first O-ring seal at least partially disposed within the internal circumferential groove of the inner bushing sleeve.

In accordance with an aspect of the invention, the elastomeric isolator includes an axially-projecting lower surface adapted to resiliently engage the one end of the cylinder body. While the elastomeric isolator's axially-projecting lower surface can be of suitable configuration for resiliently engaging the one end of the cylinder body, in a preferred embodiment, the elastomeric isolator's lower surface includes a surface feature allowing air flow away from the damper rod upon engagement of the one end of the cylinder body with the lower surface of the elastomeric isolator. In the preferred embodiment, the surface feature is a plurality of radial slots defined in the lower surface of the elastomeric isolator.

In accordance with another aspect of the invention, the upper mount assembly further includes an outer bushing sleeve disposed within the end cap's through bore and encircling at least portion of the elastomeric isolator. To the extent that the elastomeric isolator remains in touching contact with at least a portion of the through bore of the end cap, the elastomeric isolator can itself seal against the end cap through bore. Alternatively, the upper mount assembly includes a second O-ring seal disposed between the outer bushing sleeve and the end cap's through bore.

In accordance with another aspect of the invention, where the upper mount assembly is to be used in connection with a suspension assembly subject to rotation, such as a MacPherson-type strut assembly, the upper mount assembly includes an annular thrust washer disposed between the upper surface of the end cap and the lower surface of the top plate. In a preferred embodiment, the annular thrust washer includes an axial projection disposed within the through bore of the top plate, and one of an axially-projecting portion of the outer bushing sleeve or an integrally-formed axial projection of the end cap extends through the thrust washer to radially engage an inner surface of the thrust washer's axial projection.

In this manner, the upper mount assembly accommodates side loading of the damper rod by providing a force path through either the outer bushing sleeve or the end cap, while further damping such side loads due to the radial interposition of the elastomeric isolator between the inner bushing sleeve and the thrust washer, i.e., the elastomeric isolator acts to compensate for and limit movement of the damper rod resulting from side load forces, thereby limiting or otherwise containing inappropriate movement of the damper rod.

Further, the axially-projecting outer bushing sleeve or end cap projection preferably also includes an outer circumferential groove. A circlip disposed within the outer circumferential groove serves to retain the end cap and thrust washer(s) in the top plate's through bore. Alternatively, the end cap projection can include a snap feature for retaining the end cap within the through bore of the top plate.

From the foregoing, it will be appreciated that the upper mount assembly's elastomeric isolator advantageously provides vertical damper rod isolation from the rest of the assembly while further providing both lateral force transfer between the damper rod and the assembly's top plate, and accommodating conical damper rod distortion relative to the assembly's encircling end cap. Further, the axially projecting face of the elastomeric isolator provides an integrally-formed, relatively-low-profile jounce bumper adapted to engage the upper surface of the damper's cylinder body, thereby permitting operation of the vehicle at reduced ride heights.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figure 1:
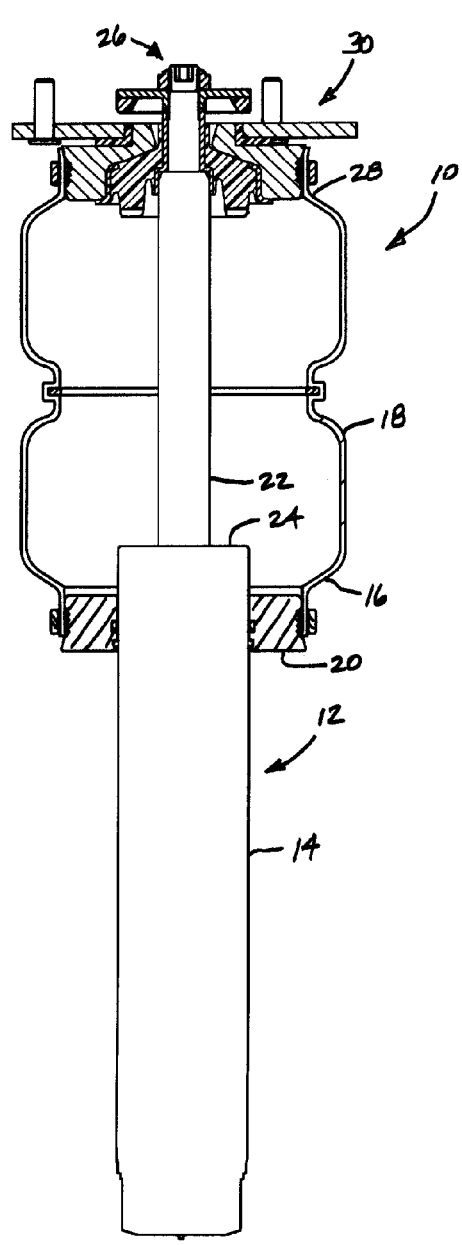
FIG. 1 is a sectional view of a bellows-type air-over strut assembly incorporating a first upper mount assembly in accordance with the invention.

Referring to FIG. 1, an exemplary double-bellows "air-over" Macpherson strut assembly 10 for a motor vehicle includes a shock absorber or damper 12 whose cylinder body 14 supports the lower end 16 of a double-bellows air spring 18 through an attached lower mount assembly 20. The damper 12 includes a damper rod 22 that telescopingly extends from the upper end 24 of the damper's cylinder body 14, such that the damper rod's free end 26 extends upwardly through the air spring bellows to the air spring's upper end 28. The strut assembly 10 further includes an upper mount assembly 30 adapted to sealingly support the upper end 28 of the air spring 18.

Figure 2:
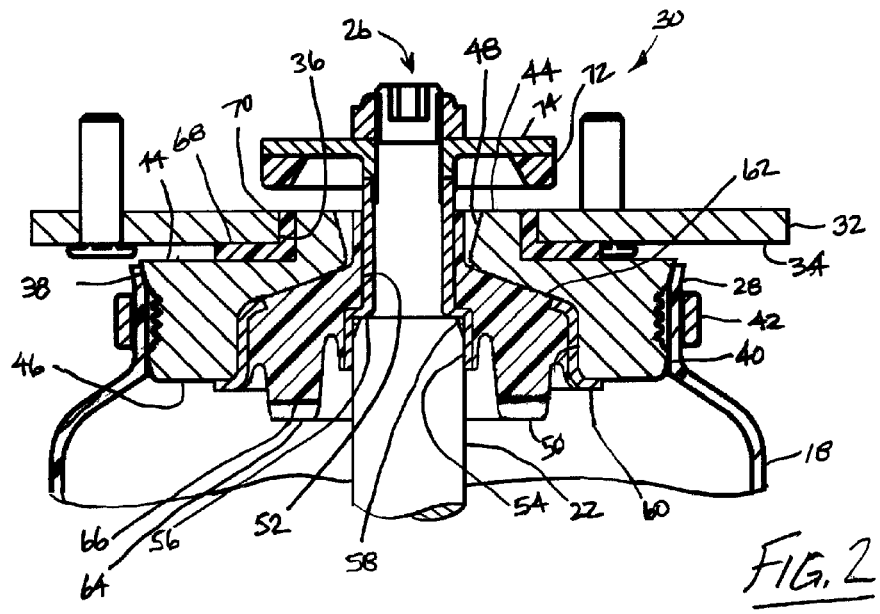
FIG. 2 is an enlarged, partial sectional view of the first upper mount assembly showing its damping rod isolator with an integrally-formed low-profile jounce bumper.

As best seen in FIG. 2, the first upper mount assembly 30 includes a top plate 32 having a lower surface 34 and a through bore 36. The first upper mount assembly 30 further includes an annular end cap 38, adapted to sealingly support the upper end 28 of the air spring 18 about its outer periphery 40 using a crimp ring 42. The end cap 38 has an upper surface 44, a lower surface 46, and a through bore 48 extending between the end cap's upper and lower surfaces 44,46. The end cap's through bore 48 is adapted to receive an annular elastomeric isolator 50 that itself includes a central bore 52. The end cap 38 may preferably be constructed from aluminum, while the elastomeric isolator 48 may be a urethane polymer or, more preferably, a natural rubber, EPDM, or Nitrile, and preferably with a durometer of ranging between about 65 and about 80.

The first upper mount assembly 30 further includes an inner bushing sleeve 54 that is disposed within the elastomeric isolator's central bore 52 and receives the upper portion of the damper rod 22 proximate to its free end 26. The inner bushing sleeve 54 includes an axially-disposed surface which, in the first upper mount assembly 20, is defined by a radial shoulder 56. The inner bushing sleeve 52 receives the free end 26 of the damper rod 22 such that a radial shoulder on the damper rod 22 abuttingly engages the opposed radial shoulder 56 of the inner bushing sleeve 54. An inner O-ring seal 58, seated against the inner bushing sleeve's radial shoulder 56, achieves an air-tight seal between the damper rod 22 and the inner bushing sleeve 54.

An outer bushing sleeve 60 is disposed within the end cap's through bore 48, between the end cap 38 and the elastomeric isolator 50. The outer bushing sleeve 60 encircles only the lower portion of the elastomeric isolator 50, thereby providing touching contact between the upper outer surface 62 of the elastomeric isolator 50 and the end cap's through bore 48. An integral air seal is thus provided between the elastomeric isolator 50 and the encircling end cap 38, thereby obviating the need for a separate seal between those elements.

It is noted that, in a preferred method of making the first upper mount assembly 30, the elastomeric isolator 50 is preferably molded between the inner and outer bushing sleeves 54,60, whereupon the resulting subassembly is press fit into the end cap's through bore 48. It will be appreciated that, if a press-fit alone is considered inadequate to retain the resulting subassembly in the end cap 38, for example, during rebound loading, a secondary retention mechanism such as the combination of a circumferential groove formed in the interior surface of the end cap 38 and an accompanying snap ring (both not shown) may also be used.

In accordance with an aspect of the invention, the elastomeric isolator 50 includes an axially-projecting lower surface 64 adapted to resiliently engage the upper end 24 of the damper's cylinder body 14. While the elastomeric isolator's axially-projecting lower surface 64 can be of suitable configuration for resiliently engaging the upper end 24 of the damper's cylinder body 14, in the first upper mount assembly 30, the elastomeric isolator's lower surface 64 includes a plurality of radial slots 66 that allow air to flow away from the damper rod 22 upon engagement of the damper's cylinder body 14 with the elastomeric isolator's lower surface 64. The radial slots 66 ensure that, upon jounce impact, pressurized air is not otherwise forced upward along the damper rod 22, to avoid over-pressurization of the first upper mount assembly's inner O-ring seal 58.

The first upper mount assembly 30 also includes a rotation bearing in the form of a thrust washer 68 disposed between the upper surface 44 of the end cap 38 and the lower surface 34 of the top plate 32. The thrust washer 68 includes an axial projection 70 extending into the top plate's through bore 38. While the invention contemplates use of any appropriate material for the thrust washer 68, in a constructed embodiment, the thrust washer 68 is formed of a thermoplastic polymer sold under the trademark DELRIN by DuPont, or of an ultra-high molecular weight (UHMW) plastic such as ultra-high molecular weight polyethylene (UHMWPE), also known as high-modulus polyethylene (HMPE) or high-performance polyethylene (HPPE).

Still further, the first upper mount assembly 30 includes a top-out rubber 72 supported on the underside of a top-out washer 74 secured to the free end 26 of the damper rod 22. The top-out rubber and washer 72,74 may be constructed as a pre-molded natural rubber, EPDM, or Nitrile top-out rubber that is bonded to a machined or formed washer. A force path is thus provided between the top plate 32 and the damper rod 22 under full extension (e.g., "top-out") applications.

The first upper mount assembly 30 thus advantageously provides the first strut assembly 10 with both damping force isolation and jounce bumper functionality. Specifically, the first upper mount assembly 30 provides damping force isolation, independent of air spring force, while further accommodating conical misalignment of the damper rod so as to minimize damper binding. The first upper mount assembly 30 also provides a limitation on damper compression travel, due to the elastomeric isolator's axially-projecting lower surface 64, which operates to dissipate the jounce forces directly through the thrust washer and the top plate to the vehicle chassis to which the top plate 32 is secured. Still further, the concept of the single molded part (the elastomeric isolator 50) also provides for reaction to side load which might be applied to the damper, while the first upper mount assembly's thrust washer 68 accommodates air spring/damper rotation. Thus, the first upper mount assembly 30 in accordance with the invention provides for spring force reaction, side load reaction, compression travel limitation, and air spring/damper rotation.

Figure 3:
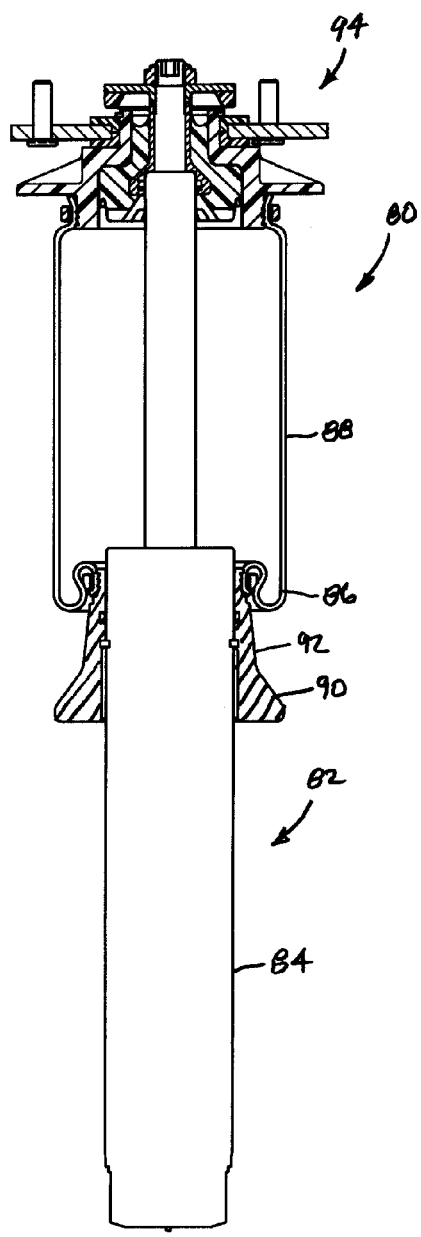
FIG. 3 is a sectional view of an air-over sleeve shock assembly incorporating a second upper mount assembly in accordance with the invention.

Referring to FIG. 3, an exemplary sleeve strut assembly 80 for a motor vehicle similarly includes a shock absorber or damper 82 whose cylinder body 84 supports the lower end 86 of a sleeve-type air spring 88 with a lower mount 90 sealingly supported by the damper's cylinder body 84. The lower mount 90 includes a contoured outer surface 92 which by which to "tune" the effective spring rate of the air spring over a desired range of suspension travel. The relative position of the lower mount 90 about the damper's cylinder body 84 is also axially adjustable, for example, through the use of multiple rings or a threaded engagement of the lower mount to the cylinder body (not shown).

Figure 4:
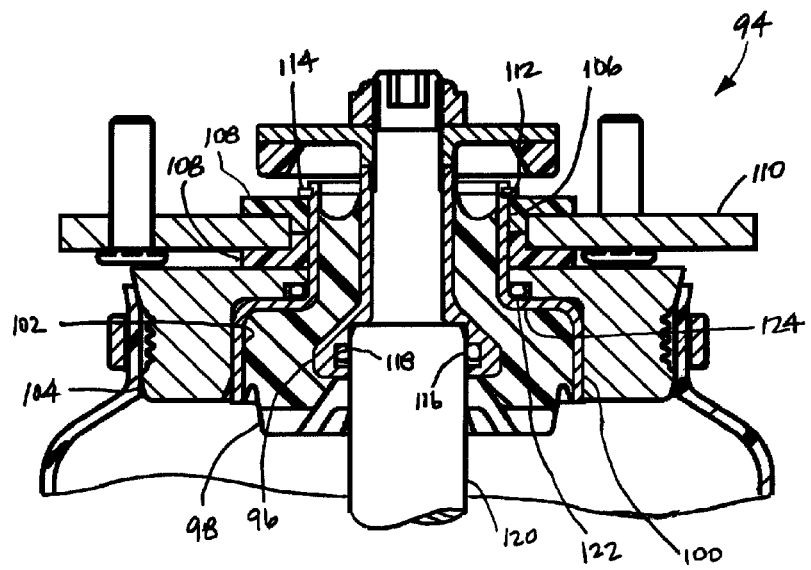
FIG. 4 is an enlarged, partial sectional view of the second upper mount assembly of FIG. 3.

As best seen in FIG. 4, the sleeve strut assembly 80 includes a second exemplary upper mount assembly 94 that includes an inner bushing sleeve 96 and elastomeric isolator 98 similar to those of the first upper mount assembly 30 discussed in connection with FIGS. 1 and 2 above. The second upper mount assembly 94 likewise includes an outer bushing sleeve 100 that is received in a complementary through bore 102 of an encircling end cap 104. However, in contrast with the first upper mount assembly 30, the outer bushing sleeve 100 of the second upper mount assembly 94 extends axially through the end cap 104 to project upwardly out of the top of the end cap 104. In this manner, the radially-outer surface 106 of the outer bushing sleeve 100 directly radially engages each of a pair of opposed thrust washers 108, to thereby define a path for transmitting radial damper rod loads to the top plate 110 captured between the thrust washers 108.

A circumferential groove 112 cut in the radially-outer surface 106 of the outer bushing sleeve 100, proximate to its upper end, advantageously receives a circlip 114 to thereby securely retain the outer bushing sleeve 100 within the top plate 110. An inner O-ring seal 116, seated within an internal circumferential groove 118 of the inner bushing sleeve 96 so as to be disposed between the damper rod 120 and the inner bushing sleeve 96, achieves an air-tight seal between the damper rod 120 and the inner bushing sleeve 96. A second O-ring 122 is disposed between the outer bushing sleeve 100 and the end cap through bore 102 to seal the through bore 102 around the outer bushing sleeve 100.

In another variation from the first upper mount assembly 30, the through bore 102 of the second upper mount assembly's end cap 104 includes a radial shoulder defining an axial-facing surface 124 through which to react applied jounce forces through to the end plate.

Figure 5:
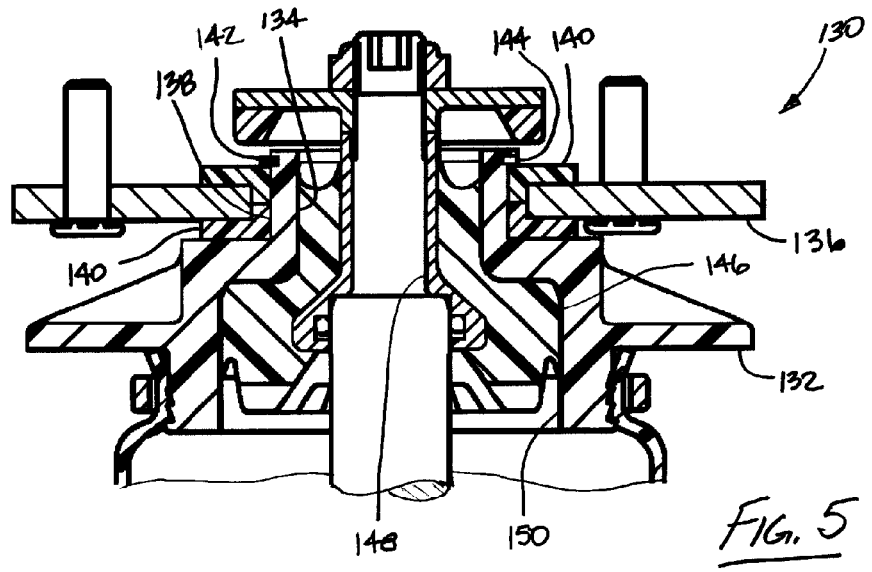
FIG. 5 is an enlarged, partial sectional view of a third upper mount assembly in accordance with the invention.

FIG. 5 shows an exploded partial sectional view of a third exemplary upper mount assembly 130 in accordance with the invention. In the third upper mount assembly 130, the end cap 132 is injection molded to provide the axially-extending projection 134 that extends through the top plate 136. While the invention contemplates the use of any suitable material, in a constructed embodiment, the third upper mount assembly's end cap 132 is advantageously molded of fiber-reinforced nylon, such as Zytel. The end cap projection 134 includes a radially-outer surface 138 which radially engages the pair of thrust washers 140, and a circumferential groove 142 adapted to receive a circlip 144. Preferably, the elastomeric isolator 146 is co-molded with the end cap 132 and inner bushing sleeve 148 to thereby bond the elastomeric isolator 146 within the end cap's through bore 150 while also achieving an improved air-tight seal therebetween.

Figure 6:
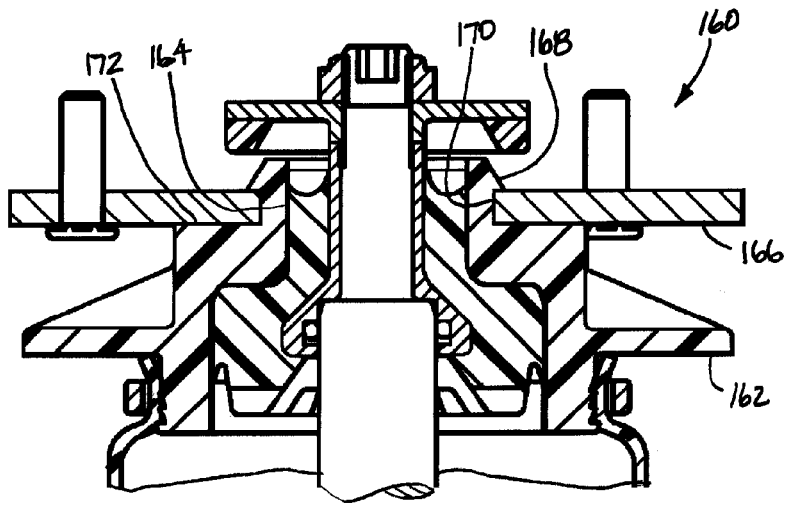
FIG. 6 is an enlarged, partial sectional view of a fourth upper mount assembly in accordance with the invention.

FIG. 6 shows an exploded partial sectional view of a fourth exemplary upper mount assembly 160 in accordance with the invention, for use in a non-rotating air-over shock absorber application, as might be found in the rear of a vehicle. In the fourth upper mount assembly 160, which also features an injection-molded end cap 162 with an axially-extending projection 164 extending through the top plate 166, the projection 164 includes a molded-in snap profile 168 that simplifies assembly while securely retaining the end cap 162 within the top plate's through bore 170. Because such rear shock assemblies exhibit little, if any, rotation over the full range of suspension travel, the fourth upper mount assembly 160 does not utilize separate thrust washers. However, it will be appreciated that, if desired, suitable lubrication can be applied between the top plate 166 and the opposed upper surface 172 of the end cap 162 during assembly or, alternatively, an additional element such as a thin Teflon washer (not shown) can be placed between the top plate 166 and the upper surface 172 of the end cap 162 during assembly, to minimize wear associated with any relative rotation of the top plate 166 and end cap 162.

While the above description constitutes the preferred embodiments, it will be appreciated that the invention is susceptible to modification, variation and change without departing from the proper scope and fair meaning of the subjoined claims.

What is claimed is:

1. An upper mount assembly for a vehicle suspension assembly, wherein the vehicle suspension assembly includes a damper having a cylinder body and a damper rod telescopingly extending through one end of the cylinder body, and an air spring having a lower end supported on the cylinder body such that a free end of the damper rod extends in the direction of an upper end of the air spring, the damper rod including a radial shoulder proximate to the free end, the upper mount assembly comprising:
- a top plate having an upper surface, a lower surface, and a through bore extending between the upper surface and the lower surface of the top plate;
- an annular end cap adapted to sealingly support the upper end of the air spring, the end cap including an upper surface, a lower surface, and a through bore extending between the upper surface and the lower surface of the end cap;
- an annular elastomeric isolator retained within the through bore of the end cap, the elastomeric isolator including a central bore;
- an inner bushing sleeve disposed within the central bore of the isolator, the inner bushing sleeve having an axially-disposed surface, and the inner bushing sleeve being adapted to receive the free end of the damper rod such that the radial shoulder on the damper rod abuttingly engages the axially-disposed surface of the inner bushing sleeve; and
- a seal adapted to be disposed between the damper rod and the inner bushing sleeve when the damper rod is received within the inner bushing sleeve, the seal achieving an air-tight seal between the damper rod and the inner bushing sleeve,
- wherein the isolator includes an axially-projecting lower surface adapted to resiliently engage the one end of the cylinder body.

2. The upper mount assembly of claim 1, wherein the inner bushing sleeve includes an internal circumferential groove, and wherein the seal is a first O-ring seal at least partially disposed within the internal circumferential groove.

3. The upper mount assembly of claim 1, further including an outer bushing sleeve disposed within the through bore of the end cap and encircling at least portion of the isolator.

4. The upper mount assembly of claim 3, wherein further including a second O-ring seal disposed between the outer bushing sleeve and the through bore of the end cap.

5. The upper mount assembly of claim 1, including an annular thrust washer disposed between the upper surface of the end cap and the lower surface of the top plate.

6. The upper mount assembly of claim 5, wherein the annular thrust washer includes an axial projection disposed within the through bore of the top plate.

7. The upper mount assembly of claim 6, further including an outer bushing sleeve disposed within the through bore of the end cap and encircling at least portion of the isolator, wherein the outer bushing sleeve projects axially through the upper face of the end cap and the axial projection of the thrust washer to radially engage an inner surface of the axial projection of the thrust washer.

8. The upper mount assembly of claim 7, wherein the outer bushing sleeve includes an outer circumferential groove, and including a circlip disposed within the outer circumferential groove.

9. The upper mount assembly of claim 5, wherein the end cap includes a projection extending axially through the axial projection of the thrust washer to radially engage an inner surface of the axial projection of the thrust washer.

10. The upper mount assembly of claim 9, wherein the projection of the end cap includes an outer circumferential groove, and including a circlip disposed within the outer circumferential groove.

11. The vehicle suspension assembly of claim 9, wherein the end cap includes a projection extending axially through the through bore of the top plate, the projection of the end cap including an outer circumferential groove disposed above the upper surface of the top plate; and including a circlip disposed within the outer circumferential groove.

12. The upper mount assembly of claim 1, wherein the end cap includes a projection extending axially through the through bore of the top plate, the projection including a snap feature for retaining the projection of the end cap within the through bore of the top plate.

13. The upper mount assembly of claim 1, wherein the lower surface of the isolator includes a surface feature allowing air flow away from the damper rod upon engagement of the one end of the cylinder body with the lower surface of the isolator.

14. The upper mount assembly of claim 13, wherein the surface feature is a plurality of radial slots defined in the lower surface of the isolator.

15. The upper mount assembly of claim 1, further including a top-out washer adapted to be secured to the free end of the damper rod, the top-out washer including an axial projection defining an axial surface in abutting engagement with an upper surface of the inner bushing sleeve.

16. A vehicle suspension assembly comprising:
- a damper having a cylinder body and a damper rod telescopingly extending through one end of the cylinder body;
- an air spring having a lower end supported on the cylinder body such that a free end of the damper rod extends in the direction of an upper end of the air spring, the damper rod including a radial shoulder proximate to the free end;
- a top plate having a through bore extending between the upper surface and the lower surface of the top plate;
- an annular end cap adapted to sealingly support the upper end of the air spring, the end cap including an upper surface, a lower surface, and a through bore extending between the upper surface and the lower surface of the end cap;
- an annular elastomeric isolator retained within the through bore of the end cap, the elastomeric isolator including a central bore;
- an inner bushing sleeve disposed within the central bore of the isolator and having an axially-disposed surface, the inner bushing sleeve being disposed about the free end of the damper rod such that the radial shoulder on the damper rod abuttingly engages the axially-disposed surface of the inner bushing sleeve;
- an O-ring disposed between the damper rod and the inner bushing sleeve; and
- a top-out washer secured to the free end of the damper rod, the top-out washer including an axial projection defining an axial surface abutting an upper surface of the inner bushing sleeve,
- wherein the isolator includes an axially-projecting lower surface adapted to resiliently engage the one end of the cylinder body.

17. The vehicle suspension assembly of claim 16, further including an outer bushing sleeve disposed within the through bore of the end cap and encircling at least portion of the isolator.

18. The vehicle suspension assembly of claim 17, wherein further including a second O-ring seal disposed between the outer bushing sleeve and the through bore of the end cap.

19. The vehicle suspension assembly of claim 17, wherein the outer bushing sleeve extends axially through the through bore of the top plate, and wherein the outer bushing sleeve includes an outer circumferential groove disposed above the upper surface of the top plate; and including a circlip disposed within the outer circumferential groove.

20. The vehicle suspension assembly of claim 16, including an annular rotation bearing disposed between the upper surface of the end cap and a lower surface of the top plate.

21. The vehicle suspension assembly of claim 20, wherein the rotation bearing is an annular thrust washer including an axial projection disposed within the through bore of the top plate, and wherein the outer bushing sleeve projects axially through the upper face of the end cap and the axial projection of the thrust washer to radially engage an inner surface of the axial projection of the thrust washer.

22. The vehicle suspension assembly of claim 20, wherein the rotation bearing is an annular thrust washer including an axial projection disposed within the through bore of the top plate, and wherein the end cap includes a projection extending axially through the axial projection of the thrust washer to radially engage an inner surface of the axial projection of the thrust washer.

23. The vehicle suspension assembly of claim 16, wherein a lower surface of the isolator includes a plurality of radial slots in the lower surface of the isolator.

* * * * *